大,395,954
Patented Aug. 6, 1968

3,395,954
PRESENSITIZED BALL BEARINGS
Philippe Boillat, Bienne, Switzerland, assignor to Roulements Miniatures, S.A., Bienne, Switzerland, a Swiss corporation
Filed Aug. 1, 1966, Ser. No. 569,154
Claims priority, application Switzerland, Aug. 13, 1965, 11,414/65
5 Claims. (Cl. 308—183)

ABSTRACT OF THE DISCLOSURE

This disclosure concerns a ball bearing which has an interior ring, an exterior ring and a middle ring, at least one set of balls between the interior ring and the middle ring and at least one set of balls between the exterior ring and the middle ring with means for moving the middle ring with a rotary oscillating movement about the axis of the bearing, characterised by the fact that these means comprise an actuation device rotated about an axis parallel to the axis of the bearing and having an eccentric part engaging in a housing formed at the edge of the middle ring.

---

In certain devices, such as gyroscopes, apparatuses comprising dynamically balanced rotary elements or indicator devices for measuring apparatuses, it is necessary to use bearings whose torque resistance due to friction and to irregularities of the bearing, is maintained at a value as low as possible.

In addition to the idea of using bearings in which a liquid or a gas separates the elements which are displaced one with respect to the other, a complicated solution which cannot be used with success when the ambient temperature is subject to large variations, it has also been proposed to use ball bearings having double rollers in which the median ring, which constitutes the exterior ring of the interior bearing, is constantly moved, preferably with an alternating movement, in a manner that the residual resistant torque resulting from the difference of the resistance torques of opposite directions are practically null.

Different solutions have been proposed for moving the median ring. In a first solution, the median ring constitutes the rotor of a small motor whose stator poles are carried by an exterior ring having two rollers. In another solution, the median ring is moved by a vibration maintained electromagnetically with the aid of an external oscillator. These two solutions are relatively complicated and their miniaturisation comes up against great difficulties, the power with which the median ring is moved diminishing very rapidly with the dimensions of the windings and of the armatures. Another solution, applied to gyroscopes, constitutes furnishing the median ring with a toothed crown of a diameter larger than that of the exterior ring so as to be able to drive it mechanically with a relatively large torque. An external reverser mechanism controlled electrically permits the desired alternating movement to be obtained. Sufficient power is achieved at the price of cumbersomeness and heavy weight. On the other hand in its application to a gyroscope, a bearing must have a very precise center of gravity, of the order of a micron, in order to avoid any precession of the gyroscope. Now it is difficult to obtain such a precision by using an intermediate ring rigid with a crown of large diameter on which is exerted moreover the pressure of the driving pinion.

The present invention has for its object the realisation of a pre-sensitized ball bearing obviating the disadvantages of the solutions cited above.

The presensitized ball bearing according to the invention, comprises an interior ring, an exterior ring and a median ring, at least one set of balls between the interior ring and the median ring and at least one set of balls between the exterior ring and the median ring, and means to move the median ring with an oscillating movement around the axis of the bearing. It is characterized by the fact that the said means comprise essentially an actuating device driven rotationally around an axis parallel to the axis of the bearing and having an eccentric part engaging in a housing formed at the edge of the median ring.

In this manner, it is possible to realize a very compact bearing having a small volume, while moving the median ring with a sufficient power. This disposition also permits a presensitized bearing of low cost price to be realized.

The accompanying drawings represent, by way of example, two embodiments of the invention.

Figure 1:
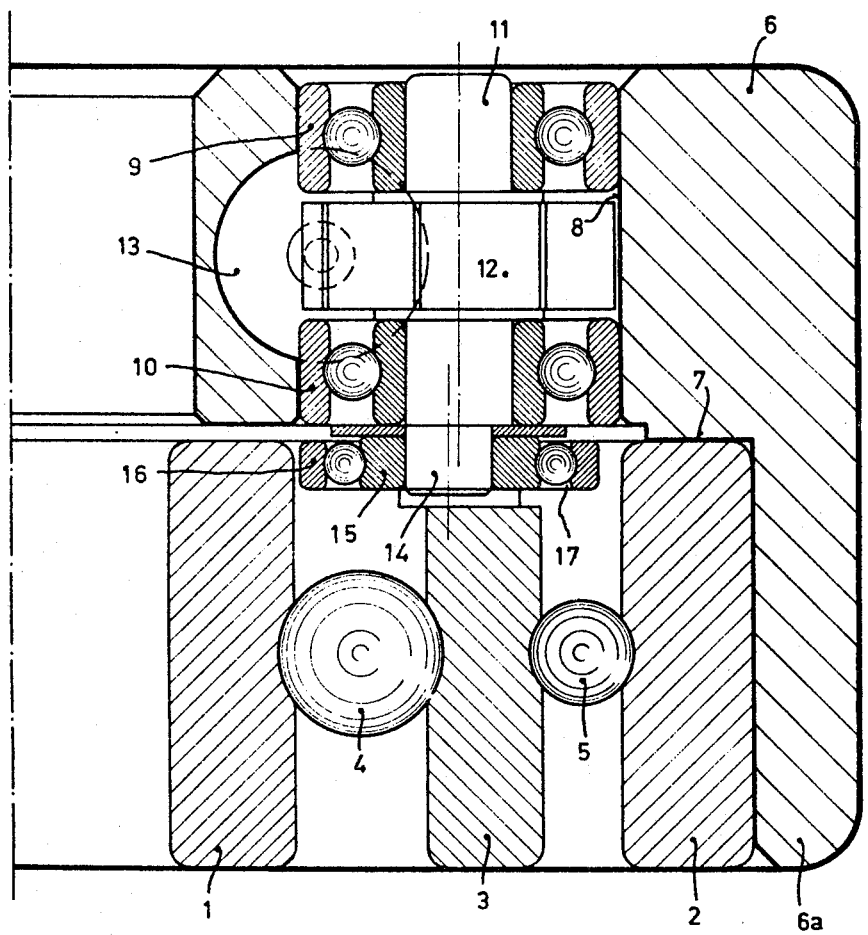
FIGURE 1 shows in section a bearing comprising a turbine for the actuation of the median ring.

The bearing shown in FIGURE 1 is constituted by an interior ring 1, an exterior ring 2, and a median ring 3, a set of balls 4 being disposed between the ring 1 and the ring 3, while a set of balls 5 is disposed between the ring 2 and the ring 3. This bearing is fixed by its exterior ring 2 in a housing 7 in an annular piece 6 whose total height is less than double the height of the rings 1, 2 and 3. The wall 6a of the housing 7, of thickness less than that of the rings 1 and 2, covers and protects the double ball-bearing.

In a cylindrical housing 8 whose axis is parallel to the axis of the bearing, and passes approximately through the middle of the right section of the median ring 3, is housed the device for actuating the median ring. The latter comprises a short shaft 11 turning in two ball bearings 9 and 10, and carrying a turbine driven by compressed air arriving through a pipe 13. The lower end of the shaft 11 carries an eccentric crank 14 driving the hub 15 of a ball bearing in its eccentric movement, the exterior ring 16 of this bearing force fitted in a cylindrical but not closed housing 17 formed in the edge of the median ring 3. When the turbine operates, the median ring 3 is thus moved with an oscillating movement of small amplitude as a result of the rotation of eccentric shaft 14 and hub 15. It is clear however that the ball bearings 15 and 16 are not absolutely indispensable, a crank 14 and a housing 17, well polished and slightly lubricated, giving already very satisfactory results with respect to the wear by friction. The trials have permitted it to be established that the amplitude of the oscillation of the median ring 3 was completely sufficient and that the residual resistance torque was at least as small as in the proposed constructions. This construction permits robust and compact bearings of small dimensions to be realized for example 16 mm. in total diameter by 7.5 mm. in total height.

Figure 2:
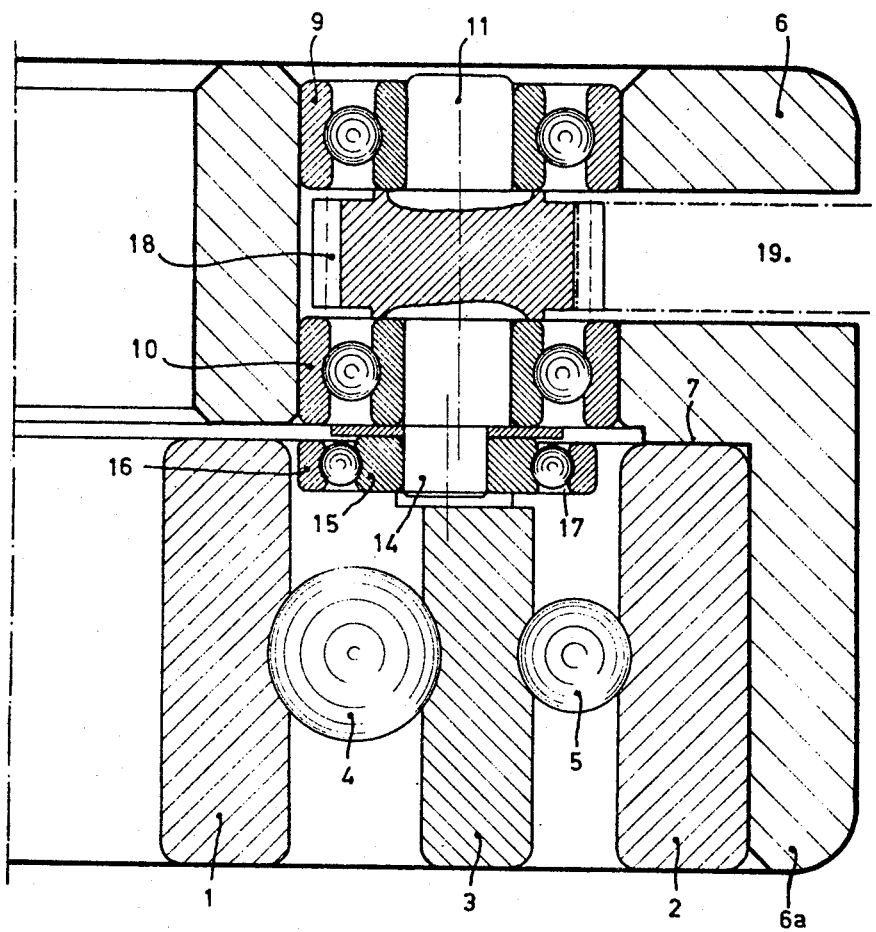
FIGURE 2 shows in section a bearing using gearing for the actuation of the median ring.

The bearing shown in FIGURE 2 only differs from that shown in FIGURE 1 by the driving of the shaft 11, the latter carrying a pinion 18 meshing with a toothed wheel 19 driven by an exterior motor. Instead of penetrating laterally into an annular piece 6, as shown in the drawing, the toothed wheel 19 can be housed in a hole parallel to the hole 8 whose axis would coincide with the prolongation of the axis of the motor.

Other modifications are of course possible with respect to the manner of driving the shaft 11.

It is also established that a better balance of the rings of the bearing could be assured by using two sets of balls between the median ring and the exterior ring of the bearing. This follows logically from the fact that the median ring is then maintained between three rolling tracks situated in three different planes.

What is claimed is:

1. Presensitized ball bearing comprising an interior ring, an exterior ring and a median ring mounted along a given axis, at least one set of balls between said interior ring and said median ring, and at least one set of balls between said exterior ring and said median ring, means for moving said median ring with a rotary oscillating movement about said axis, said means comprising an actuation device rotated about an axis parallel to said axis, said device comprising a ball bearing, a short shaft mounted on said ball bearing, and an eccentric crank prolonging said shaft, said median ring having at the edge thereof a housing receiving said eccentric crank.

2. Bearing according to claim 1, having a second ball bearing comprising an interior ring, and an exterior ring of said second ball bearing, said interior ring engaging in said housing of said median ring, said crank being secured in said interior ring of said second ball bearing.

3. Bearing according to claim 1, wherein said exterior ring has integral therewith an annular piece for housing said actuating device.

4. Bearing according to claim 1, wherein said short shaft carries a turbine wheel.

5. Bearing according to claim 1, wherein said short shaft has a pinion operatively connected to said actuating device for driving the same.

References Cited

UNITED STATES PATENTS 2,970,480   2/1961   Zeigler et al. _____ 308—183 XR

FOREIGN PATENTS 647,002   12/1950   Great Britain.
914,743   1/1963   Great Britain.

MARTIN P. SCHWADRON, *Primary Examiner.*

FRANK SUSKO, *Assistant Examiner.*